(12) United States Patent
Guillaudeux et al.

(10) Patent No.: US 12,547,760 B2
(45) Date of Patent: Feb. 10, 2026

(54) METHOD FOR EVALUATING THE RISK OF RE-IDENTIFICATION OF ANONYMISED DATA

(71) Applicant: BIG DATA SANTE, Nantes (FR)

(72) Inventors: Morgan Guillaudeux, Nantes (FR); Olivier Breillacq, Nantes (FR)

(73) Assignee: BIG DATA SANTE, Nantes (FR)

(*) Notice: Subject to any disclaimer, the term of this patent is extended or adjusted under 35 U.S.C. 154(b) by 370 days.

(21) Appl. No.: 18/030,558

(22) PCT Filed: Oct. 7, 2021

(86) PCT No.: PCT/FR2021/000113
§ 371 (c)(1),
(2) Date: Apr. 6, 2023

(87) PCT Pub. No.: WO2022/074301
PCT Pub. Date: Apr. 14, 2022

(65) Prior Publication Data
US 2023/0367901 A1 Nov. 16, 2023

(30) Foreign Application Priority Data

Oct. 7, 2020 (FR) ...................................... 2010259

(51) Int. Cl.
*G06F 21/62* (2013.01)
*G06F 21/54* (2013.01)
*G06F 21/57* (2013.01)

(52) U.S. Cl.
CPC .......... *G06F 21/6245* (2013.01); *G06F 21/54* (2013.01); *G06F 21/575* (2013.01); *G06F 21/6254* (2013.01)

(58) Field of Classification Search
None
See application file for complete search history.

(56) References Cited

U.S. PATENT DOCUMENTS

| | | | | |
|---|---|---|---|---|
| 2010/0077006 | A1* | 3/2010 | El Emam | G06F 16/284 707/E17.032 |
| 2018/0114037 | A1* | 4/2018 | Scaiano | G06F 21/6254 |
| 2019/0026490 | A1* | 1/2019 | Ahmed | G06F 21/6254 |

FOREIGN PATENT DOCUMENTS

| | | |
|---|---|---|
| EP | 3567508 A1 | 11/2019 |
| FR | 3048101 A1 | 8/2017 |

OTHER PUBLICATIONS

Calvino Aida et al.: "Factor Analysis for Anonymization", 2017 IEEE International Conference on Data Mining Workshops (ICDMW), IEEE, Nov. 18, 2017, pp. 984-991.

(Continued)

*Primary Examiner* — Syed A Roni
(74) *Attorney, Agent, or Firm* — LEASON ELLIS LLP

(57) ABSTRACT

(EN) The method of the invention provides a protection rate (txP2) representative of the risk of re-identification of data. In the case of a distance-based correspondence-seeking attack, the method comprises the steps of: a) linking an original dataset (EDO) comprising a plurality of original individuals (IO) with an anonymised dataset (EDA) comprising a plurality of anonymised individuals (IA); b) transforming (PCA, MCA, FAMD) the original individuals and the anonymous individuals in a Euclidean space; c) identifying for each original individual, one or more nearest anonymous individuals based on a distance, by a method referred to as the "k-NN" method; and d) calculating the protection rate, being a mean number (Nm) of anonymous individuals, nearest to a considered original individual ($IO_j$), who are not a valid anonymous individual corresponding to the original individual considered, the nearest anonymous individuals being those identified in step c) and having a distance (dy) relative to the considered original individual less than the distance between the considered original individual and the valid anonymous individual.

6 Claims, 3 Drawing Sheets

(56) References Cited

OTHER PUBLICATIONS

Josep Domingo-Ferrer et al.: "Disclosire risk assessment in statistical microdata protection via advanced record linkage", Statistics and Computing, Kluwer Academic Publishers, BO, vol. 13, No. 4, Oct. 1, 2003, pp. 344-346.
Pagliuca Daniela et al.: "Some Results of individual Ranking Method on the System of Enterprise Accounts Annual Survey", In: "Statistical Disclosure Control", Jul. 30, 1998, pp. 11-12, 15-16.
Robinson-Cox J.F., « A record-linkage approach to imputation of missing data : Analyzing tag retention in a tag-recapture experiment », Journal of Agricultural, Biological, and Environmental Statistics 3(1), 1998, pp. 48-61.
Winkler W.E., « Matching and record linkage », Cox B.G. (Ed.), Business Survey Methods, Wiley, New York, 1995, pp. 355-384.
Fellegi I.P. et al., Jaro M.A., et Winkler W.E., « A theory of record linkage », Journal of the American Statistical Association 64, 1969, pp. 1183-1210.
Jaro M. A., « Advances in record-linkage methodology as applied to matching the 1985 Census of Tampa, Florida », Journal of the American Statistical Association 84, 1989, pp. 414-420.
Domingo-Ferrer J. et al., « Disclosure risk assessment via record linkage by a maximum-knowledge attacker », 13th Annual Conference on Privacy, Security and Trust (PST), 2015.
Kounine A. et al., « Assessing Disclosure Risk in Anonymized Datasets », FloCon 2008 Conference.
International Search Report for corresponding International Application No. PCT/FR2021/000113, dated Feb. 11, 2022.

\* cited by examiner

METHOD FOR EVALUATING THE RISK OF RE-IDENTIFICATION OF ANONYMISED DATA

CROSS-REFERENCE TO RELATED PATENT APPLICATIONS

This application is a U.S. National Stage Application under 35 U.S.C. § 371 of International Patent Application No. PCT/FR2021/000113 filed Oct. 7, 2021, which claims the benefit of priority of French Patent Application No. 2010259 filed Oct. 7, 2020, both of which are incorporated by reference in their entireties. The International Application was published on Apr. 14, 2022, as International Publication No. WO/2022/074301 A1.

The invention generally relates to the anonymization of sensitive data intended to be shared with third parties, for example for purposes of searching, analysis or exploitation thereof. More particularly, the invention relates to a method for evaluating the risk of re-identifying anonymized data.

Generally, data are a source of performance for organizations and constitute a significant asset for them. Data provide critical and valuable information for the production of quality goods and services, as well as for decision-making. They provide a competitive advantage that allows organizations to endure and stand apart from the competition. Data sharing, for example in the form of open data, is now perceived as offering many opportunities, in particular for the expansion of human knowledge and understanding, and the innovation and creation of new products and services.

Data have become readily sharable with digital technologies and technological innovations, beyond the organizations that collect them and store them for use. The digital transformation of society, with the growth of social media, the democratization of online consumption, the digitalization of services, etc., has generated a phenomenon of data proliferation called "big data". This phenomenon of data proliferation has grown with the adoption by a large number of countries of so-called "open data" public policies, which promote the opening and sharing of the data. Technologies that are currently available allow for the storage, processing and analysis of this ever-growing mass of data and make it possible to extract knowledge and usable information therefrom.

Data can contain personal data, called "personal data", which are the subject of privacy-related regulations. Thus, generally, the use, the storage and the sharing of the personal data are subject in France to the European Regulation GDPR, for "General Data Protection Regulation", and to the French law known as the "Loi informatique et libertés". Certain data, such as those relating to health, privacy, family life, wealth, and other things, are particularly sensitive and must be handled with particular precautions.

Several anonymization methods are known and used to process original data so as to protect the privacy of individuals. Data anonymization may be defined as a process that eliminates the association between the identifying dataset and the data subject. The anonymization process aims to prevent the unique identification of an individual in a dataset, or the linking of two records within the same dataset, or between two distinct datasets when one of the records corresponds to an individual's specific data, and the deduction of information from the dataset. Thus, following an anonymization process, the data are presented in a form that must not make it possible to identify individuals, even when combined with other data.

The "k-anonymization" anonymization method is one of the more common methods. This method seeks to make each record of a dataset indistinguishable from at least k−1 other records of that dataset. The "L-diversity" anonymization method is an extension of the "k-anonymization" method which allows for better protection of the data by involving in each group of k records, called a "k-group", the presence of at least L sensitive attribute values.

In general, the main known anonymization algorithms modify the data by deleting, generalizing, or replacing personal information in the individual records. An alteration of the information content of the data may be the consequence of excessive anonymization. However, it is important for the anonymized data to remain quality data that retain maximum information content. It is on this condition that anonymized data remain useful for extracting knowledge by analyzing and combining with other data.

The choice of the anonymization algorithm and the adjustment of the operating parameters thereof are important to reconcile both the obligation of privacy protection and the need to preserve the utility of the data. In the prior art, there is no known single anonymization algorithm which fits all the contexts and which gives the best result each time. Several anonymization algorithms exist, with variable degrees of reliability and applicability contexts. The applicability context of the anonymization algorithms is characterized, inter alia, by the type of data to be anonymized and by the desired use of the anonymized data.

The degree of reliability of the anonymization algorithm is directly related to the risk of re-identification of the anonymized data. This risk encompasses the risk of individualization, that is, the possibility of isolating an individual, the risk of correlation, that is, the possibility of linking distinct datasets concerning one and the same individual, and the risk of inference, that is, the possibility of deducing information about an individual. However, facing the evolution of information technologies which make it possible to link data from different sources, it is almost impossible to guarantee anonymization that would offer zero risk of re-identification.

Different methods for evaluating the risk of re-identification of a dataset that has undergone anonymization processing, also called "metrics" below, have been proposed and provide quantitative evaluations of this risk.

Some of these metrics make use of the method known as "record-linkage", which is described by Robinson-Cox J. F. in the article "A record-linkage approach to imputation of missing data: Analyzing tag retention in a tag-recapture experiment", Journal of Agricultural, Biological, and Environmental Statistics 3(1), 1998, pp. 48-61. This method, which consists of comparing the individuals from a dataset that has been subjected to anonymization processing to an original dataset, was initially developed to improve the quality of the data by connecting records relating to the same person from distinct files. It also makes it possible to evaluate the robustness of anonymization processing in the face of a re-identification attempt wherein the attacker is in possession of the anonymized dataset and of original data about one or more individuals and is seeking to prove that they belong to the anonymized cohort.

Deterministic coupling methods, discussed by Gill L. in the article "Methods for Automatic Record Matching and Linking and Their Use in National Statistics", National Statistics Methodology Series no. 25, 2001, London: Office for National Statistics, assume the existence of a set of common variables in the files to be linked. The major problem of such an assumption is that a procedure for exact matching of the values adopted by the variables common to the individuals is not always possible, or sufficient, to establish a link between the records. This problem is discussed by Winkler W. E. in the article "Matching and record linkage", Cox B. G. (Ed.), Business Survey Methods, Wiley, New York, 1995, pp. 355-384. In reality, between the variables common to two matched records, there are a multitude of small or large differences coming from several factors which prevent a perfect match between the values of these variables.

To overcome the aforementioned problem, non-deterministic methods have been developed that make it possible to establish a link between two records, with a matching that can be probabilistic or based on a distance between the individuals.

Probabilistic matching makes it possible to establish link probabilities between records. Two records are considered to be linked when the probability of linkage between them exceeds a certain threshold. Probabilistic matching is described by Fellegi L P. et al., Jaro M. A., and Winkler W. E. in their respective articles "A theory of record linkage", Journal of the American Statistical Association 64, 1969, pp. 1 183-1210, "Advances in record-linkage methodology as applied to matching the 1985 Census of Tampa, Florida", Journal of the American Statistical Association 84, 1989, pp. 414-420, and "Advanced methods for record linkage", Proceedings of the American Statistical Association Section on Survey Research Methods, 1995, pp. 467-472.

Distance-based matching is described by Pagliuca D. et al. in the publication "Some Results of Individual Ranking Method on the System of Enterprise Accounts Annual Survey, Esprit SDC Project", Deliverable MI-3/D2, 1999. In this approach, distances are established between the individuals and each individual has been associated with the nearest record or the second-nearest record, and is said to be "linked to nearest" or "linked to 2nd nearest".

The present invention aims to provide a new method for evaluating the risk of re-identifying anonymized data during a distance-based correspondence-seeking attack.

According to a first aspect, the invention relates to a computer-implemented data processing method for evaluating an anonymized data re-identification risk, the method providing a protection rate representative of the risk of re-identification in the case of a distance-based correspondence-seeking attack, the method comprising the steps of a) linking an original dataset comprising a plurality of original individuals with an anonymized dataset comprising a plurality of anonymous individuals, the anonymous individuals being produced by an anonymization process on original individuals; b) transforming the original individuals and the anonymous individuals in a Euclidean space, the original individuals and anonymous individuals being represented by coordinates in Euclidean space; c) identifying for each original individual, one or more anonymous individuals based on a distance, by a method known as the "k-NN" method, and d) calculating the protection rate as a mean number of anonymous individuals nearest to the considered original individual who are not a valid anonymous individual corresponding to the considered original individual, the nearest individuals being those identified in step c) and having a distance relative to the considered original individual less than the distance between the considered original individual and the valid anonymous individual.

According to a particular characteristic of the method, the aforementioned distance is a Euclidean distance.

According to another particular characteristic of the method, the transformation of step b) is carried out by means of a factor analysis method and/or using an "auto-encoder" artificial neural network.

According to yet another particular characteristic of the method, the factor analysis method used in step b) is a "Principal Component Analysis" method when the individuals comprise continuous variables, a "Multiple Correspondence Analysis" method when the individuals comprise qualitative variables or a "Factor Analysis of Mixed Data" method when the individuals comprise "continuous/qualitative" type variables.

The invention further relates to a data anonymization computer system comprising a data storage device that stores program instructions for implementing the method as briefly described above.

The invention further relates to a computer program product comprising a medium wherein program instructions readable by a processor for implementing the method as briefly described above are saved.

Other advantages and features of the present invention will become more clearly apparent on reading the following description of several particular embodiments with reference to the appended drawings, in which.

In the following description, for purposes of explanation and not of limitation, specific details are provided to allow an understanding of the described technology. It will be obvious to the person skilled in the art that other embodiments may be put into practice outside the specific details described below. In other cases, the detailed descriptions of well-known methods, techniques, etc. are omitted so as not to complicate the description with unnecessary details.

The evaluation of the risk of re-identification requires comparing a set of original data formed from so-called original individuals to a set of anonymized data formed from individuals said to be anonymous. The individuals are typically data records. Each anonymous individual of the anonymized dataset represents an anonymized version of a corresponding original individual. A pair consisting of an original individual and a corresponding anonymous individual is referred to as an "original/anonymous pair". The risk of re-identification is the risk that an attacker is able to link an original individual to its anonymized record, i.e. the corresponding anonymous individual, thus forming a valid original/anonymous pair.

The method according to the invention for evaluating the data re-identification risk provides a metric, based on an individual-centric approach, which makes it possible to quantify the risk of re-identification of an item of personal data during a distance-based correspondence-seeking attack.

Figure 1:
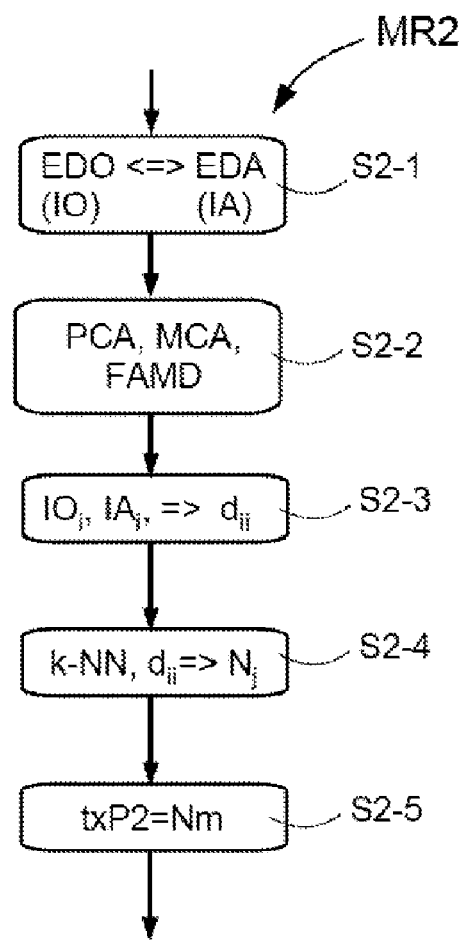
FIG. 1 is a flowchart showing a particular embodiment of the method according to the invention.
Figure 2:
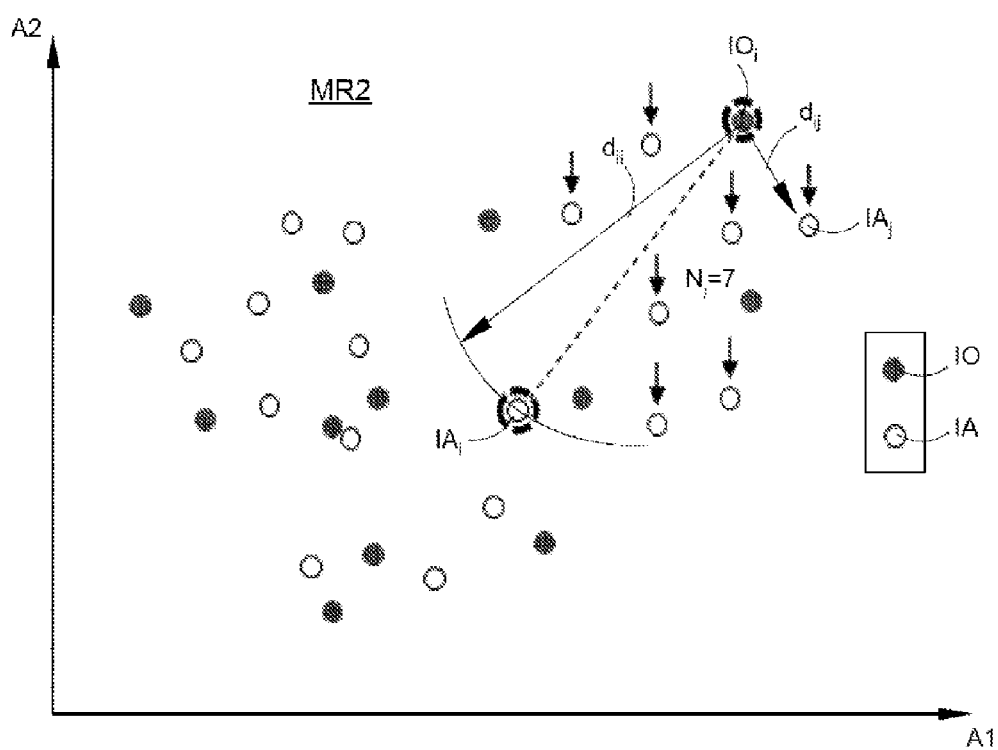
FIG. 2 shows an illustrative diagram relating to the embodiment of the method according to the invention of FIG. 1.

Referring to FIGS. 1 and 2, one particular embodiment, designated MR2, of the method of the invention, will now be described, which has interesting applicability in the context of a distance-based correspondence-seeking attack. This particular embodiment MR2 is constructed with a decidedly different approach compared to the methods known from the prior art, by establishing a protection rate which is based on the evaluation of a density of the presence of anonymous individuals in the immediate environment of the original individuals.

As shown in FIG. 1, this embodiment MR2 comprises five steps S2-1 to S2-5.

The first step S2-1 performs a junction processing of the data. The first step S2-1 is a step of joining the data. In step S2-1, an original dataset EDO comprising a plurality of original individuals IO is linked to an anonymized dataset EDA comprising a plurality of anonymous individuals IA. The anonymized data EDA are those provided by an anonymization process that has processed the original data EDO corresponding thereto.

The second step S2-2 carries out a transformation processing of the individuals IO and IA in a Euclidean space. According to the invention, different transformation methods can be used. Typically, but not exclusively, a factor analysis method or an artificial neural network called an "auto-encoder" may be used to convert the individuals IO and IA into coordinates in Euclidean space.

Different factor analysis methods may be used depending on the type of data.

Thus, Principal Component Analysis, or "PCA", will typically be used when the variables are continuous. Multiple Correspondence Analysis, or "MCA", will typically be used if the variables are qualitative. Factor Analysis of Mixed Data, or "FAMD", will typically be used if the variables are mixed, that is, of the continuous type and qualitative type.

In the embodiment described here, a factor analysis method is used in step S2-2. In this step S2-2, significant variance axes are identified in the datasets by a multivariate data analysis. These significant variance axes determine the axes of Euclidean space on which the individuals IO and IA are projected.

The transformation of the individuals IO and IA in Euclidean space makes it possible to calculate mathematical distances between the individuals, from their coordinates. The method of the invention provides for a preferred use of a Euclidean distance as a mathematical distance. However, it will be noted that using other, different mathematical distances, such as a Manhattan distance, a Mahalanobis distance, or other distance falls within the vision of the present invention.

The third step S2-3 is a step of calculating mathematical distance, such as a Euclidean distance. In this step S2-3, as illustrated in FIG. 2 wherein the original individuals IO and the anonymous individuals IA are represented respectively by black circles and white circles, in a Euclidean space having axes A1 and A2, for each original individual $IO_i$ the mathematical distance $d_{ii}$ that separates it from the anonymous individual $IA_i$ with which it forms a valid origin/anonymous pair $(IO_i, IA_i)$ is calculated.

The fourth step S2-4 is a step of counting, for each original individual $IO_i$, the number $N_j$ of non-valid anonymous individuals $IA_j$ separated from the original individual $IO_i$ by a mathematical distance $d_{ij}$ which is less than the distance $d_{ii}$ calculated in step S2-3. The "k-Nearest Neighbors" method, also known as k-NN, is used here to identify for each original individual one or more nearest anonymous individuals based on a mathematical distance, such as a Euclidean distance.

In this step S2-4, as illustrated in FIG. 2, the number $N_j$ of non-valid anonymous individuals $IA_j$ present in the zone contained in the circle with radius $d_{ii}$ centered on the original individual $IO_i$ is therefore counted.

The higher the number $N_j$ is, the better-protected the original individual $IO_i$ is against re-identification. Indeed, since the $N_j$ non-valid anonymous individuals $IA_j$ are closer, in terms of mathematical distance, to the original individual $IO_i$ than the valid anonymous individual $IA_i$, a distance-based attack will be based on the preferred selection of one of the $N_j$ non-valid anonymous individuals $IA_j$ as being the corresponding anonymous individual. The number $N_j$ represents the number of possible matches for the attacker before selecting the valid anonymous individual $IA_i$.

The fifth step S2-5 is a step of calculating the protection rate of the data against re-identification, referred to herein as txP2, for the dataset considered. The protection rate txP2 is here calculated as being a median number Nm of non-valid anonymous individuals $IA_j$ present around an original individual in the considered dataset.

By way of example, let us now consider the case of an attacker who is in possession of a dataset containing anonymous data (individuals IA) of 100 people, including a considered person i. The attacker is also in possession of the original data (individual $IO_i$) of the considered person i. The attacker attempts to prove that the original data (individual $IO_i$) of the considered person i is part of the anonymized cohort. In order to re-identify the valid original/anonymous pair $(IO_i, IA_i)$, the attacker must match the individuals, and for this purpose, uses a mathematical distance between them, such as a Euclidean distance. If, for example, the data protection rate is txP2=7 for this dataset, this means that the attacker will then be in a situation, as shown in FIG. 2, wherein it will have on average $N_j$=7 non-valid anonymous individuals $IA_j$ who are closer than the valid anonymous individual $IA_i$ and are potentially selectable. Thus, the denser the environment of the original individual $IO_i$, with many non-valid anonymous individuals $IA_j$, the more difficult it will be to re-identify that individual $IO_i$.

Figure 3:
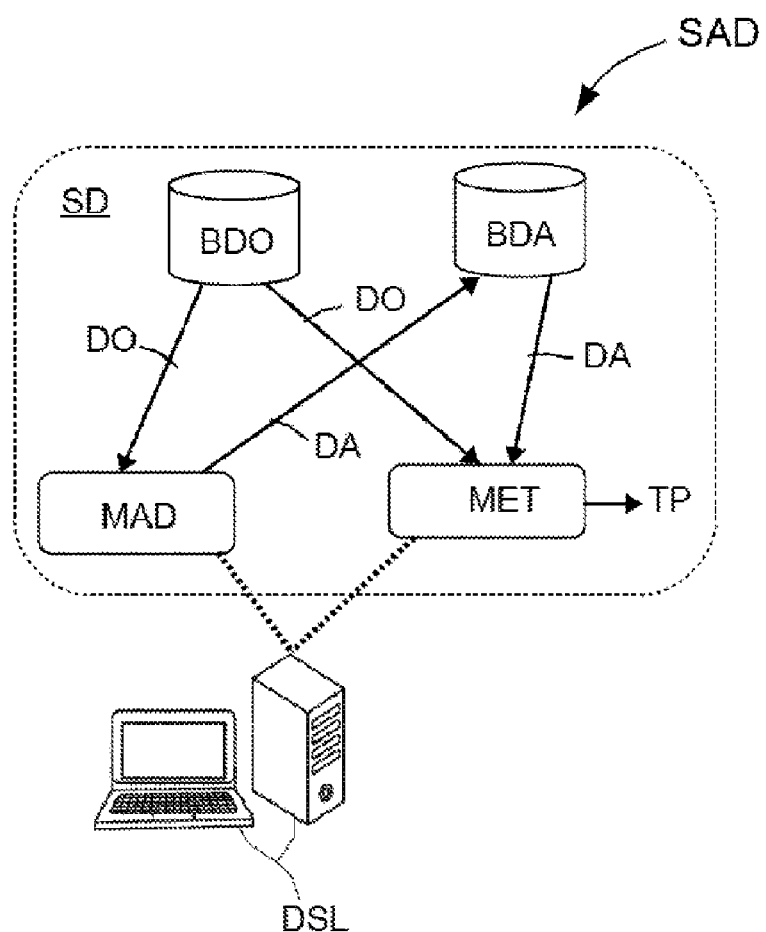
FIG. 3 shows an example of a general architecture of a data anonymization computer system wherein the method according to the invention is implemented.

By way of example, FIG. 3 shows a general architecture of a data anonymization computer system SAD wherein the method according to the invention for evaluating the re-identification risk is implemented.

The system SAD is installed here in a local computer system DSL and comprises two software modules MAD and TEM. The software modules MAD and TEM are hosted in data storage devices SD, such as a memory and/or hard drive, of the local computer system DSL. The local computer system DSL also hosts an original database BDO wherein original data DO are stored, and an anonymized database BDA wherein anonymized data DA are stored.

The software module MAD implements a data anonymization process that processes the original data DO and outputs the anonymized data DA.

The software module MET implements the method according to the invention for evaluating the risk of re-identification of the data. The software module MET receives, as input, original data DO and anonymized DA data and provides, as output, a rate TP of protection against the risk of re-identification. The implementation of the method according to the invention is ensured by the execution of code instructions from the software module MET by a processor (not shown) of the local computer system DSL. The protection rate TP provided by the software module MET provides a measurement of the performance of the data anonymization process implemented by the software module MAD.

Of course, the invention is not limited to the embodiments which have been described here by way of illustration. The person skilled in the art, depending on the applications of the invention, can provide different modifications and variants that fall within the scope of protection of the invention.

The invention claimed is:

1. A computer-implemented data processing method for evaluating an anonymized data-re-identification risk, said method providing a protection rate representative of said re-identification risk in the case of a distance-based correspondence-seeking attack, said method comprising the steps of a) linking an original dataset comprising a plurality of original individuals with an anonymized dataset comprising a plurality of anonymous individuals, said anonymous individuals being produced by a process of anonymizing said original individuals; b) transforming said original individuals and said anonymous individuals in a Euclidean space, said original individuals and anonymous individuals being represented by coordinates in said Euclidean space; c) identifying for each said original individual, one or more said anonymous individuals based on a distance, by a k-nearest neighbors (k-NN) method, and d) calculating said protection rate as a mean number of said anonymous individuals nearest to a-said original individual which are not a valid anonymous individual corresponding to said original individual, said nearest anonymous individuals being those identified in step c) and having a distance relative to said original individual less than the distance between said original individual and said valid anonymous individual.

2. The method according to claim 1, wherein said distance is a Euclidean distance.

3. The method according to claim 1, wherein the transformation of step b) is carried out by means of one or more of a factor analysis method and using an "autoencoder" artificial neural network.

4. The method according to claim 3, wherein said factor analysis method is a "Principal Component Analysis" (PCA) when said individuals comprise continuous variables, a "Multiple Correspondence Analysis" method when said individuals comprise qualitative variables, or a "Factor Analysis of Mixed Data" (FAMD) method when said individuals comprise "continuous/qualitative" type variables.

5. A data anonymization computer system comprising a data storage device that stores program instructions for implementing the method according to claim 1.

6. A computer program product comprising a medium wherein program instructions are saved that are readable by a processor for implementing the method according to claim 1.

* * * * *